(12) United States Patent
Smith

(10) Patent No.: US 11,820,480 B2
(45) Date of Patent: Nov. 21, 2023

(54) PROPULSION SYSTEM FOR A BOAT

(71) Applicant: Darrell Stephen Smith, Northumberland (GB)

(72) Inventor: Darrell Stephen Smith, Northumberland (GB)

(73) Assignee: Darrell Stephen Smith, Northumberland (GB)

( * ) Notice: Subject to any disclaimer, the term of this patent is extended or adjusted under 35 U.S.C. 154(b) by 246 days.

(21) Appl. No.: 17/268,024

(22) PCT Filed: Aug. 12, 2019

(86) PCT No.: PCT/GB2019/052261
§ 371 (c)(1),
(2) Date: Feb. 11, 2021

(87) PCT Pub. No.: WO2020/035668
PCT Pub. Date: Feb. 20, 2020

(65) Prior Publication Data
US 2021/0163112 A1 Jun. 3, 2021

Related U.S. Application Data

(63) Continuation of application No. PCT/CT2019/052261, filed on Aug. 12, 2019.

(30) Foreign Application Priority Data

Aug. 14, 2018 (GB) ..................................... 1813263

(51) Int. Cl.
*B63H 21/17* (2006.01)
*F24S 50/60* (2018.01)
(Continued)

(52) U.S. Cl.
CPC ......... *B63H 21/17* (2013.01); *B63B 15/0083* (2013.01); *B63H 9/061* (2020.02);
(Continued)

(58) Field of Classification Search
CPC ........ B63H 21/17; B63H 9/061; B63H 9/069; B63H 9/1092; B63H 2021/171;
(Continued)

(56) References Cited

U.S. PATENT DOCUMENTS

| 6,189,472 | B1 | 2/2001 | Duncan | |
| 6,848,442 | B2 | 2/2005 | Haber | |
| 2009/0188487 | A1* | 7/2009 | Jones | .................... F24S 30/452 |
| | | | | 136/246 |

FOREIGN PATENT DOCUMENTS

| CA | 1049856 A | 3/1979 |
| CN | 107697257 B | 4/2019 |
| | (Continued) | |

OTHER PUBLICATIONS

International search report for international application No. PCT/GB2019/052261, dated Oct. 10, 2019.
(Continued)

*Primary Examiner* — Stephen P Avila
(74) *Attorney, Agent, or Firm* — Quinn IP Law

(57) ABSTRACT

A propulsion system for a boat comprises a plurality of aerofoils connected to a main mast. At least one of the aerofoils is a displaceable aerofoil adapted to be displaced along the main mast between an open position and a closed position. When the displaceable aerofoil is in its open position the aerofoils together form a sail of open sail area. When the displaceable aerofoil is in its closed position at least some of the aerofoils overlap to form a sail of closed sail area, the closed sail area being less than the open sail area. The propulsion system can include a displacement (Continued)

mechanism to displace the displaceable aerofoil between its open and closed positions; at least one of the aerofoils having a solar panel thereon; and/or a stub mast extending along and free to rotate about a stub axis and connected to the main mast by a stub pivot.

18 Claims, 9 Drawing Sheets

(51) Int. Cl.

| | | |
|---|---|---|
| *F24S 30/452* | (2018.01) | |
| *B63H 9/061* | (2020.01) | |
| *B63H 9/069* | (2020.01) | |
| *B63B 15/00* | (2006.01) | |
| *B63H 9/10* | (2006.01) | |
| *F24S 30/00* | (2018.01) | |
| *B63J 3/00* | (2006.01) | |

(52) U.S. Cl.
CPC ........... *B63H 9/069* (2020.02); *B63H 9/1092* (2013.01); *F24S 30/452* (2018.05); *F24S 50/60* (2018.05); *B63B 2015/005* (2013.01); *B63H 2021/171* (2013.01); *B63J 2003/003* (2013.01); *F24S 2030/134* (2018.05)

(58) Field of Classification Search
CPC .... F24S 50/60; F24S 30/452; F24S 2030/134; B63B 15/0083; B63B 2015/005; B63J 2003/003

See application file for complete search history.

(56) References Cited

FOREIGN PATENT DOCUMENTS

| | | |
|---|---|---|
| DE | 9004412 U1 | 9/1990 |
| JP | S56116593 A | 9/1981 |
| WO | 2008098051 A2 | 8/2008 |
| WO | 2012076945 A1 | 6/2012 |
| WO | 2018039705 A1 | 3/2018 |

OTHER PUBLICATIONS

Great Britain Intellectual Property Office search report dated Feb. 4, 2020 for application No. GB1813263.9.

* cited by examiner

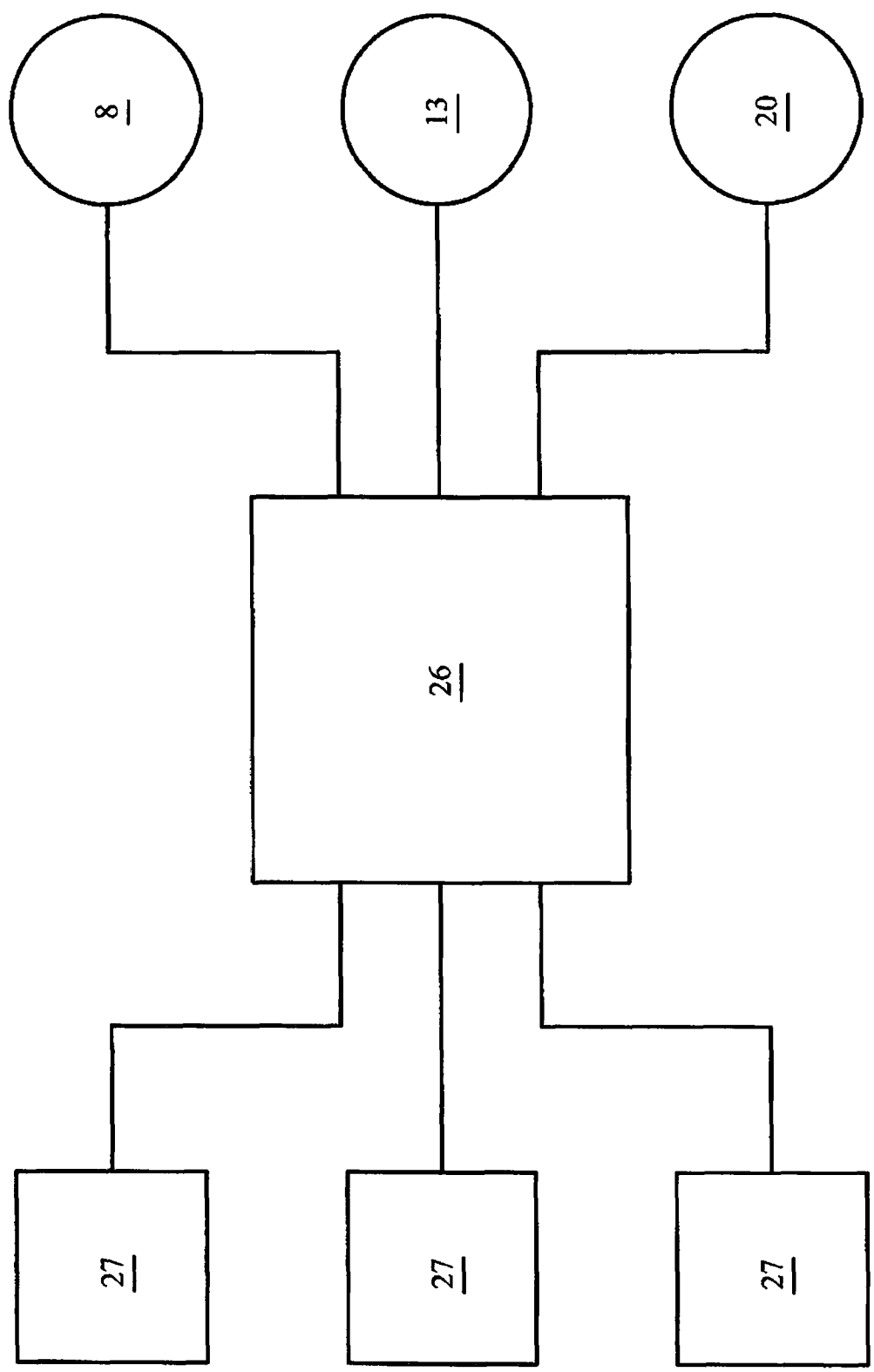

PROPULSION SYSTEM FOR A BOAT

CROSS REFERENCE TO RELATED APPLICATIONS

This application claims the benefit of PCT Patent Application No. PCT/GB2019/052261 filed on Aug. 12, 2019, entitled "A PROPULSION SYSTEM FOR A BOAT", which is incorporated by reference in its entirety in this disclosure.

TECHNICAL FIELD OF THE INVENTION

The present invention relates to a propulsion system for a boat. More particularly, but not exclusively, the present invention relates to a propulsion system for a boat comprising a plurality of aerofoils arranged on a mast, at least one of the aerofoils being adapted to be displaced along the mast, at least one of the aerofoils having a solar panel thereon. In a further aspect the present invention provides a boat comprising such a propulsion system.

BACKGROUND OF THE INVENTION

Sail boats including solar panels are known. Typically the sail boat comprises a fabric sail. The solar panels are arranged on a separate structure of the boat such as the deck or on the roof of a cabin. In this case the solar panels are in a fixed orientation with respect to the boat and so are often not in the optimal orientation for generation of solar power. Alternatively, the solar panels are arranged on a separate adjustable structure. Such a structure is typically relatively small and so cannot hold a large number of solar panels. Further, it needs to be adjusted separately from the sail to keep the solar panels in the correct orientation. This can be difficult, particularly for a novice sailor.

BRIEF SUMMARY OF THE INVENTION

The present invention seeks to overcome the problems of the prior art.

Accordingly, in a first aspect the present invention provides a propulsion system for a boat comprising
- a main mast;
- a plurality of aerofoils connected to the main mast, at least one of the aerofoils being a displaceable aerofoil, the at least one displaceable aerofoil being adapted to be displaced along the main mast between an open position and a closed position;
- wherein when the at least one displaceable aerofoil is in its open position the aerofoils together form a sail of open sail area;
- and when the at least one displaceable aerofoil is in its closed position at least some of the aerofoils overlap to form a sail of closed sail area, the closed sail area being less than the open sail area;
- a displacement mechanism adapted to displace the at least one displaceable aerofoil between its open and closed positions;
- at least one of the aerofoils having a solar panel thereon; and,
- a stub mast extending along a stub axis, the stub mast being free to rotate about the stub axis;
- the stub mast being connected to the main mast by a stub pivot.

The propulsion system according to the invention can generate both wind and solar power. By suitable arrangement of the aerofoils and main mast it can be optimised between wind power and solar power generation. Separate optimisation of a sail and solar panel support is not required which considerably simplifies operation. The aerofoils provide a large area for support of the solar panels. And so the propulsion system can still generate a significant amount of solar power even when optimised for wind power generation.

Preferably each aerofoil has a solar panel thereon.

Preferably the displacement mechanism comprises an endless cable extending at least part way along the main mast.

Preferably each displaceable aerofoil is supported by an aerofoil frame, each aerofoil frame comprising a clamp for clamping the aerofoil frame to the endless cable Preferably the propulsion system further comprises a stub rotation mechanism for rotating the stub about the stub axis.

Preferably the stub rotation mechanism comprises a mechanical gear system, preferably a worm and worm gear.

Preferably the propulsion system further comprises a pivot mechanism for pivoting the main mast with respect to the stub mast about the pivot.

Preferably the pivot mechanism comprises an extensible ram arranged between the main mast and stub mast.

Preferably the propulsion system further comprises a controller connected to the displacement mechanism for controlling the arrangement of the aerofoils.

Preferably the controller is adapted to detect at least one of force on the aerofoils, wind speed, wind direction and solar power generation and to control the arrangement of the aerofoils in response thereto.

Preferably the propulsion system comprises a plurality of displaceable aerofoils connected to the main mast, each displaceable aerofoil being adapted to be displaced between an open position for that aerofoil to a closed position for that aerofoil, the displacement mechanism being adapted to displace each displaceable aerofoil between its open and closed positions.

Preferably each displaceable aerofoil is adapted to be displaced to a different open position.

Preferably all of the displaceable aerofoils are adapted to be displaced to the same closed position.

In a further aspect of the invention there is provided a boat comprising a propulsion system as claimed in any one of claims 1 to 13.

BRIEF DESCRIPTION OF THE DRAWINGS

The present invention will now be described by way of example only and not in any limitative sense with reference to the accompanying drawings in which.

BRIEF DESCRIPTION OF THE INVENTION

Figure 1:
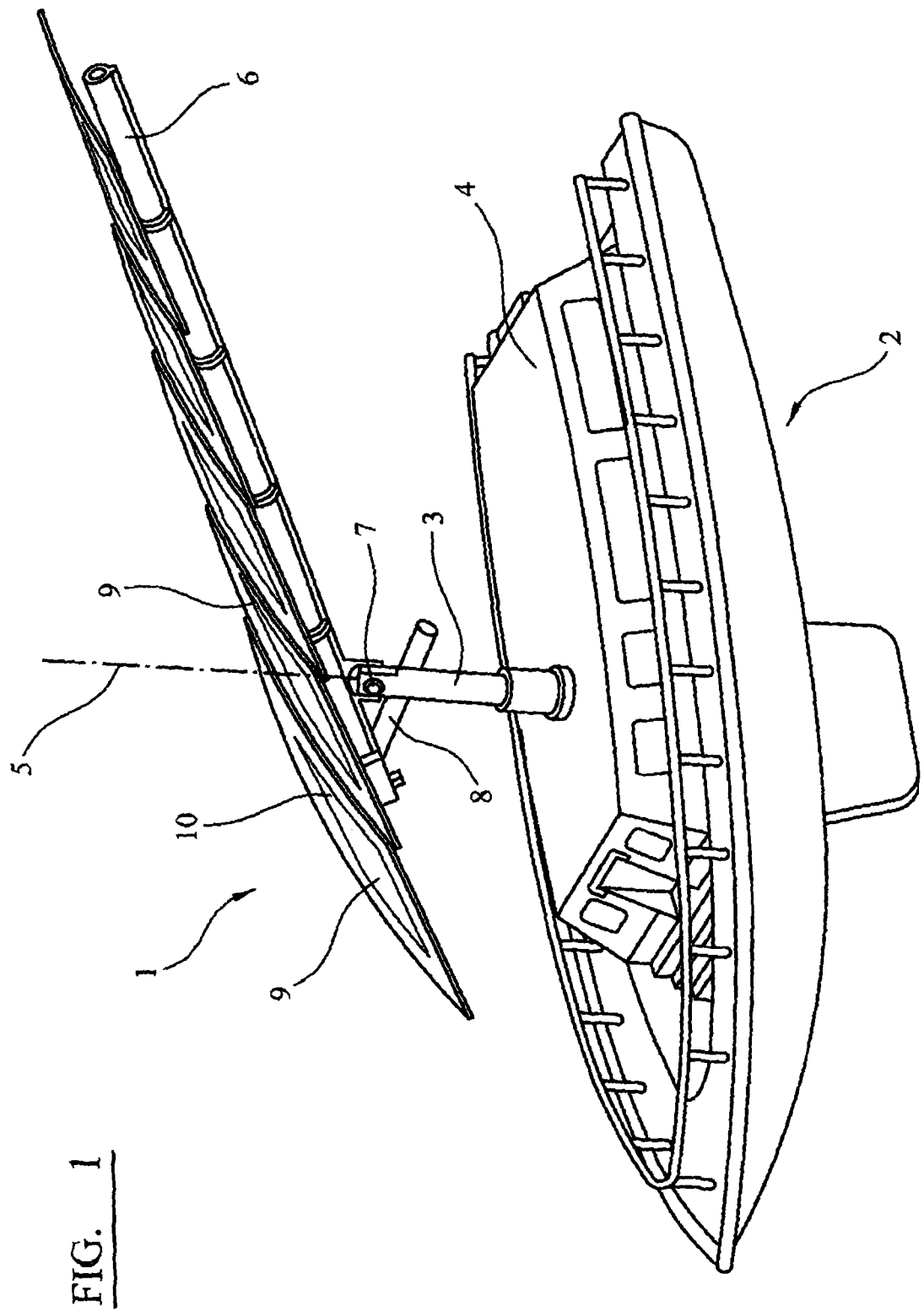
FIG. 1 shows an embodiment of a propulsion system according to the invention connected to a boat in perspective view.

Shown in FIG. 1 is a propulsion system 1 according to the invention in perspective view. The propulsion system 1 is connected to a boat 2. The propulsion system 1 comprises a stub mast 3 connected to an upper surface 4 of the boat 2. In this embodiment the stub mast 3 is connected to the roof of a cabin. In alternative embodiments it could for example be connected to the deck or through the cabin to the keel.

The stub mast 3 extends along a stub mast axis 5 and is free to rotate about the stub mast axis 5. Rotation of the stub mast 3 about the stub mast axis 5 is driven by a stub rotation mechanism which is described in more detail below.

A main mast 6 is connected to the stub mast 3 by a stub pivot 7. The main mast 6 can be pivoted with respect to the stub mast 3 about the stub pivot 7. Pivoting is achieved by means of a pivot mechanism 8 which extends between the stub mast 3 and main mast 6.

Figure 2:
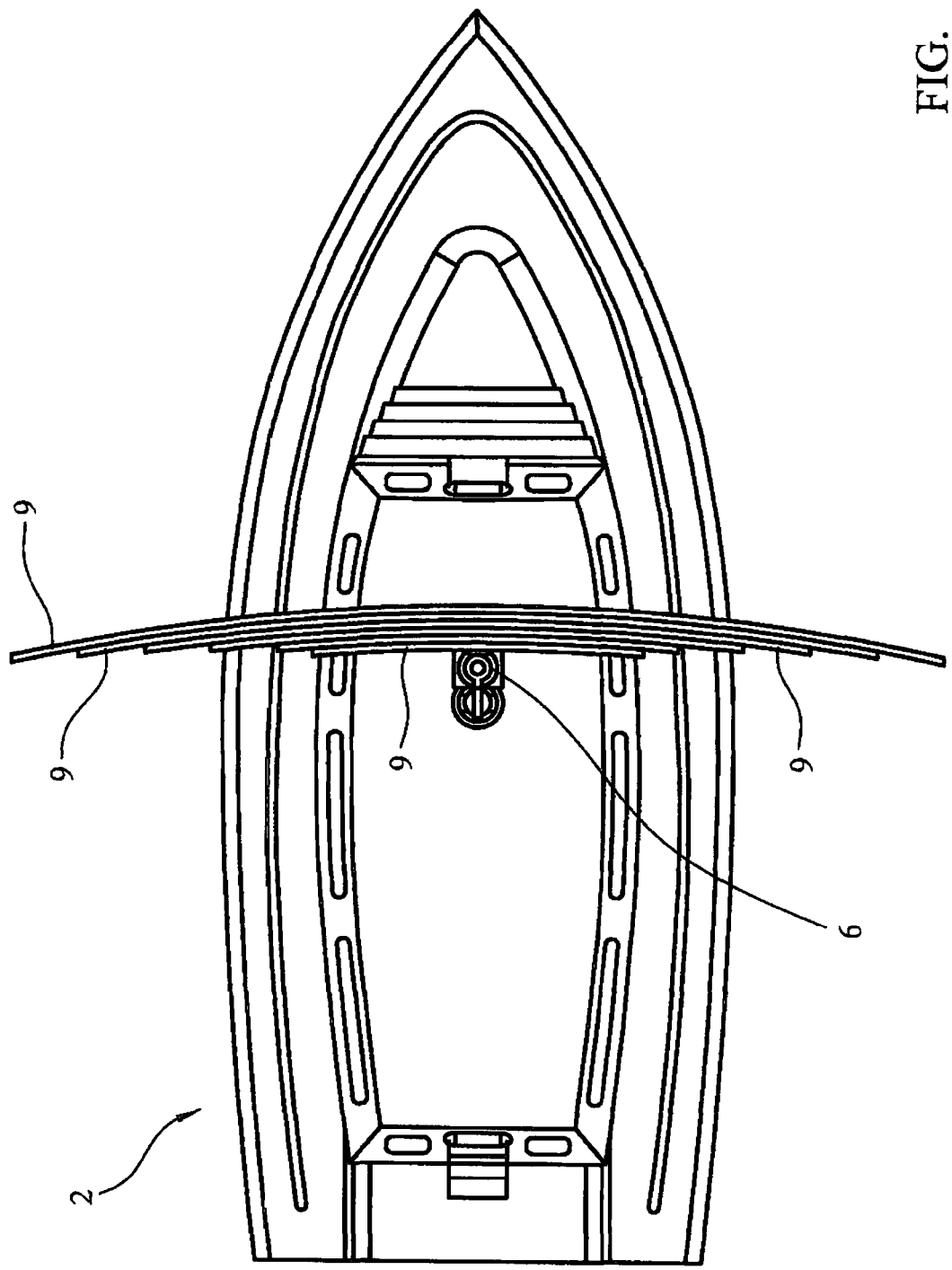
FIG. 2 shows the embodiment of FIG. 1 from above.

Connected to the main mast 6 is a plurality of aerofoils 9 each having a solar panel 10 thereon. Each of the aerofoils 9 is substantially rigid to support its associated solar panel 10. As can be seen from the perspective view of FIG. 1 each aerofoil 9 is substantially planar in the direction along the main mast 6. FIG. 2 shows the aerofoils 9 viewed from above with the main mast 6 in the vertical position. As can be seen each aerofoil 9 is curved slightly from side to side to generate aerodynamic forces perpendicular to the plane of the aerofoil.

Returning to FIG. 1, the aerofoil 9 closest to the stub mast 3 is fixed relative to the main mast 6. The remainder of the aerofoils 9 are displaceable aerofoils 9. Each displaceable aerofoil 9 is adapted to be displaced along the main mast 6 between an open position for that displaceable aerofoil 9 and a closed position for that displaceable aerofoil 9. This displacement is performed by a displacement mechanism which is described in more detail below. In FIG. 1 each displaceable aerofoil 9 is in its open position. Each displaceable aerofoil 9 has a different open position relative to the main mast 6. When the displaceable aerofoils 9 are in this arrangement the displaceable aerofoils 9 along with the fixed aerofoil 9 together form a sail of open sail area.

Figure 3:
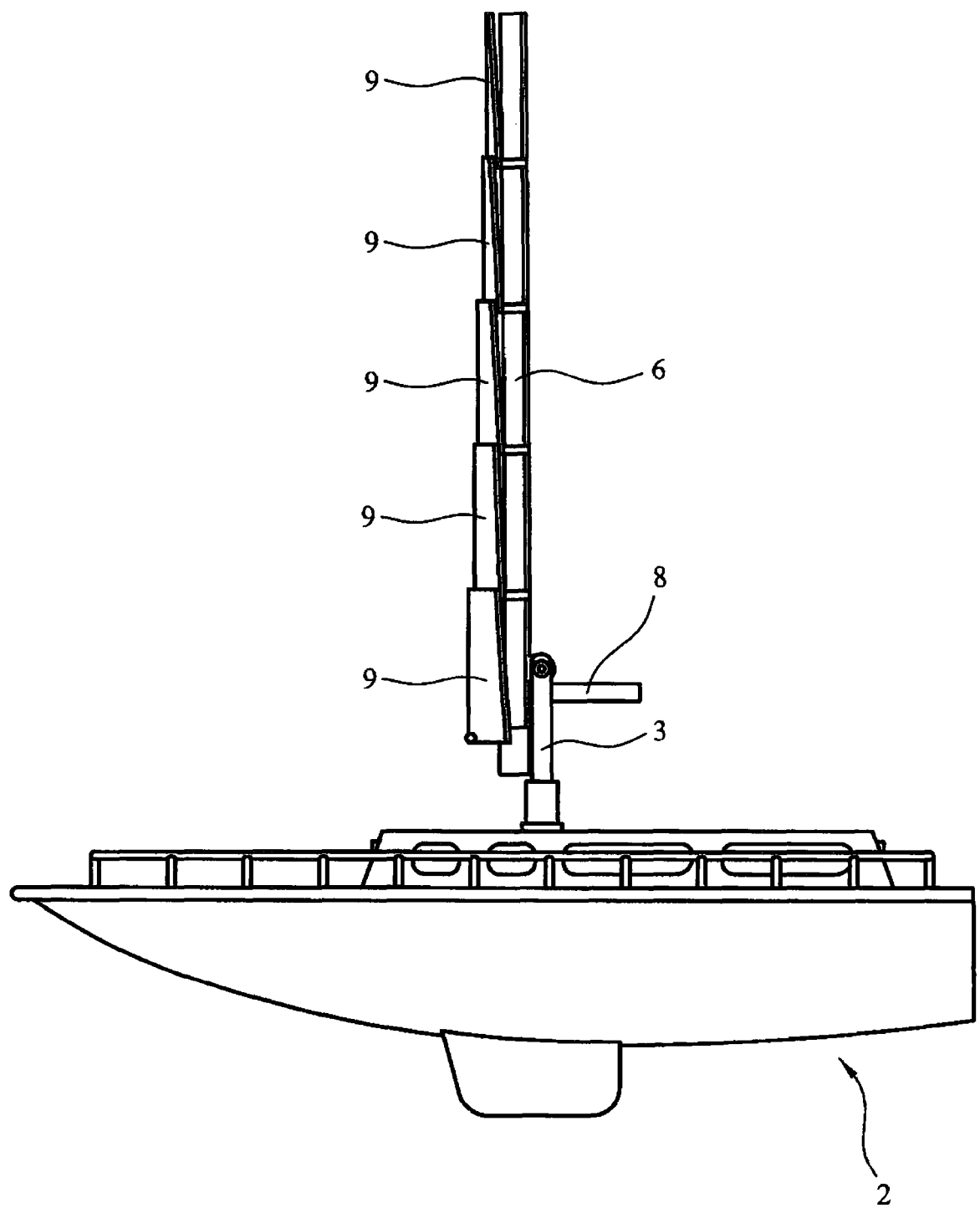
FIG. 3 shows the embodiment of FIG. 1 in side view.

Shown in FIG. 3 is the propulsion system 1 of FIGS. 1 and 2 in side view. Each displaceable aerofoil 9 is again in its open position so forming a sail of open sail area. The aerofoils 9 overlap slightly with the bottom of one aerofoil 9 overlapping the top of the aerofoil 9 below it. The overlap however is minimal and the open sail area is substantially equal to the sum of the areas of the aerofoils 9.

Figure 4:
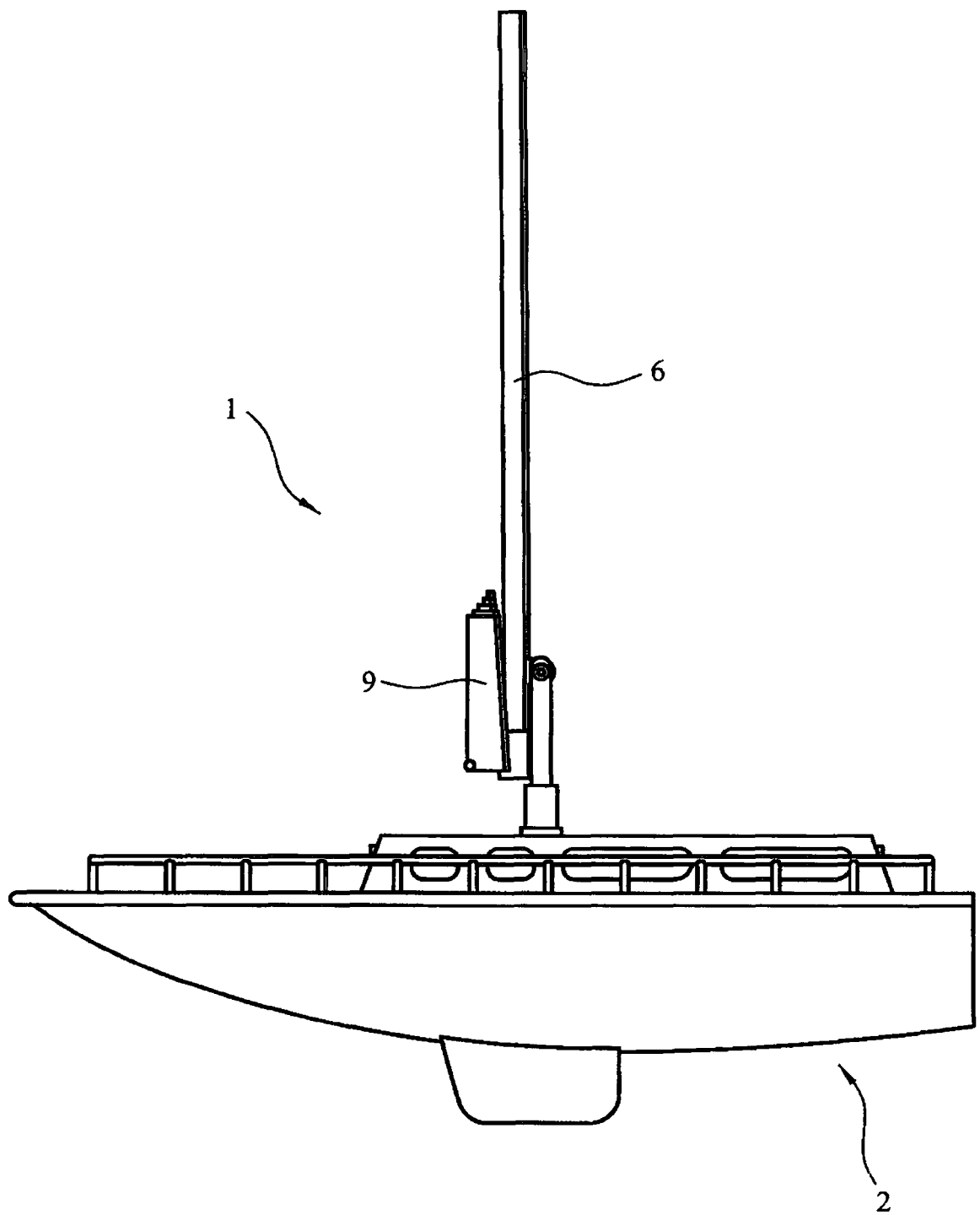
FIG. 4 shows the embodiment of FIG. 1 in side view with each aerofoil in its closed position.

Shown in FIG. 4 is the propulsion system 1 as shown in FIGS. 1 to 3 in side view, now with each of the displaceable aerofoils 9 in its closed position. The closed position for each displaceable aerofoil 9 is substantially the same. Accordingly, the aerofoils 9 now considerably overlap with each aerofoil 9 nested in the next. The aerofoils 9 together form a sail of closed sail area. The closed sail area is less than that of the open sail area and in this embodiment is substantially equal to the area of the fixed aerofoil 9. The displacement mechanism is adapted to displace each of the displaceable aerofoils 9 to any position between its open position and its closed position. This results in a sail having an effective sail area anywhere between the open sail area and closed sail area. In this embodiment the displacement mechanism displaces all the displaceable aerofoils 9 simultaneously. In an alternative embodiment the displacement mechanism is adapted to displace the displaceable aerofoils 9 individually.

Figure 5:
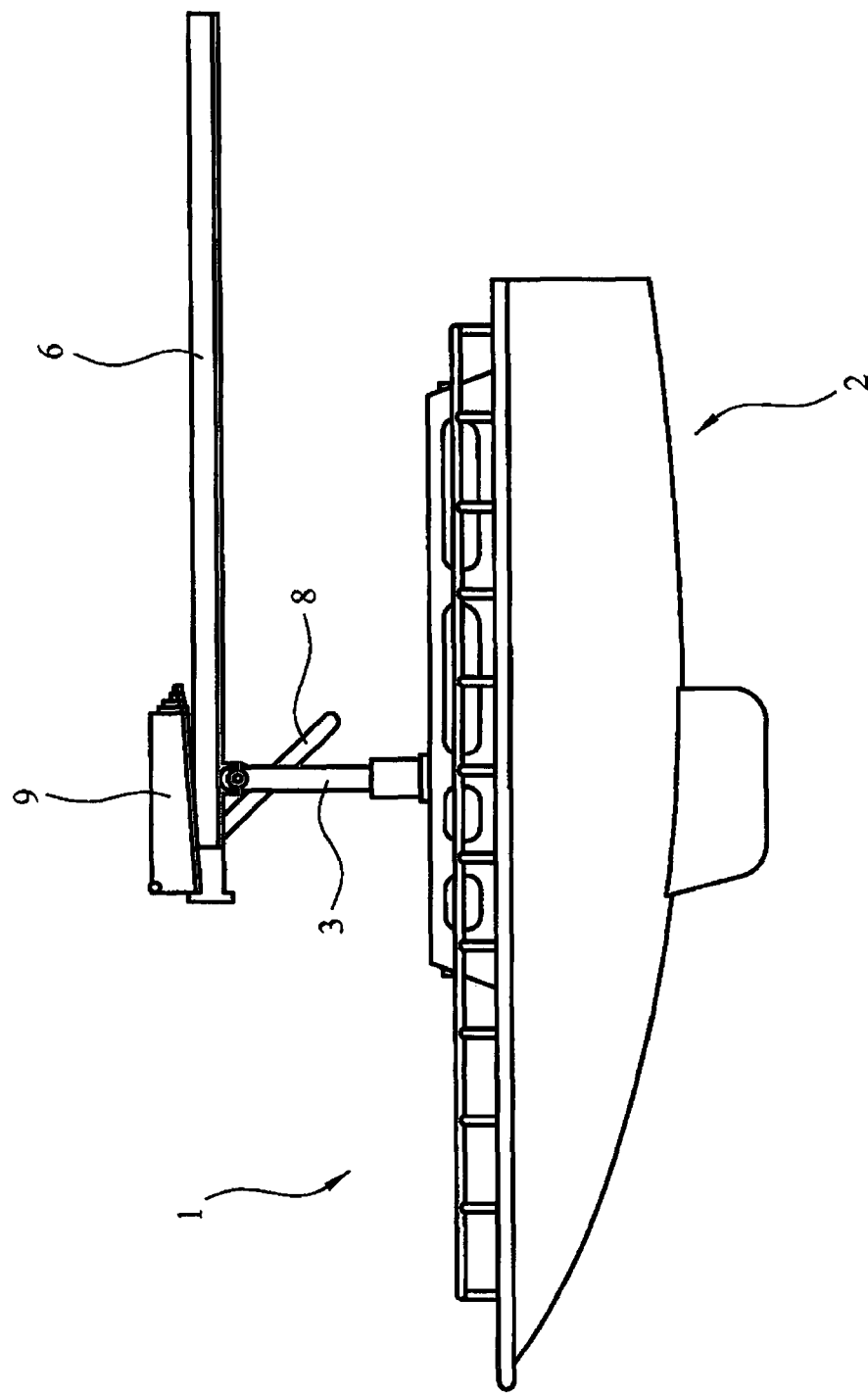
FIG. 5 shows the embodiment of FIG. 1 with the main mast in the horizontal position.

FIG. 5 is similar to that of FIG. 4 except the main mast 6 is now in the horizontal position. The main mast 6 and aerofoils 9 are arranged in this configuration during times of high winds to minimise the forces on the aerofoils 9.

Figure 6:
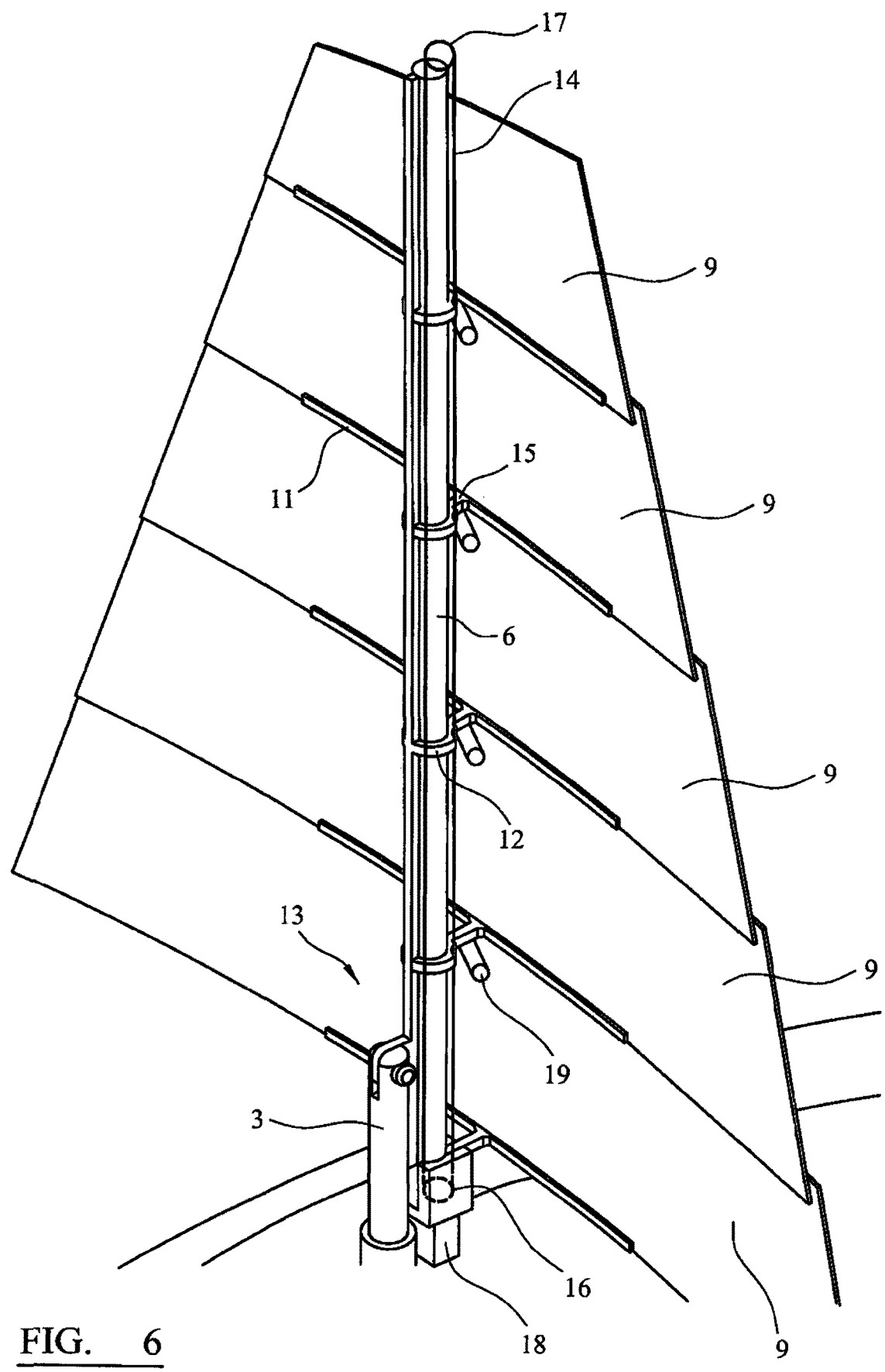
FIG. 6 shows a portion of a propulsion system according to the invention.

Shown in FIG. 6 is the main mast 6 of a propulsion system 1 according to the invention. The main mast 6 is hollow. Attached to the main mast 6 are a plurality of displaceable aerofoils 9. Each displaceable aerofoil 9 is connected to the main mast 6 by an associated aerofoil support frame 11 Each aerofoil support frame 11 supports the bottom of its associated aerofoil 9 as shown. Each aerofoil support frame 11 comprises a loop 12 which surrounds the main mast 6 constraining the aerofoil support frame 11 and hence the associated aerofoil 9 to move along the main mast 6.

FIG. 6 also shows the displacement mechanism 13 of the propulsion system 1. The displacement mechanism 13 comprises an endless cable 14 (i.e. a loop) which extends up the inside of the main mast 6 and down the outside of the main mast 6 through a hole 15 in each aerofoil support frame 11 as shown. The displacement mechanism 13 further comprises a drive pulley 16 at the bottom of the main mast 6 and a slave pulley 17 at the top of the main mast 6. The endless cable 14 passes around these as shown. The drive pulley 16 is connected to a motor 18. Each aerofoil support frame 11 further comprises a solenoid clamp 19 which can be switched between open and closed configurations by the application of an electrical signal.

In order to displace a displaceable aerofoil 9, the motor 18 turns the drive pulley 16 so rotating the endless cable 14. The solenoid clamp 19 associated with the aerofoil support frame 11 for that aerofoil 9 is closed so clamping the aerofoil support frame 11 to the endless cable 14. As the cable 14 moves the aerofoil support frame 11 and hence the associated aerofoil 9 is pulled along the main mast 6 to the desired position. Once the aerofoil 9 reaches the desired position the endless cable 14 is braked so holding the aerofoil 9 aloft in the desired position. By appropriate opening and closing of the solenoid clamps 19 and movement of the endless cable 14 the displaceable aerofoils 9 can be moved as desired along the main mast 6. Each support frame 11 may further comprise a supplemental lock (not shown) which allows the aerofoil support frame 11 to be locked in position along the mast 6 and the associated solenoid clamp 19 opened. Use of such supplemental locks enables a user to move an aerofoil 9 to a desired position along the mast 6, lock it in place with the supplemental lock, release the solenoid clamp 19 then move the endless cable 14 to displace a different displaceable aerofoil 9. Supplemental locks allow the displaceable aerofoils 9 to be moved individually if required.

Figure 7:
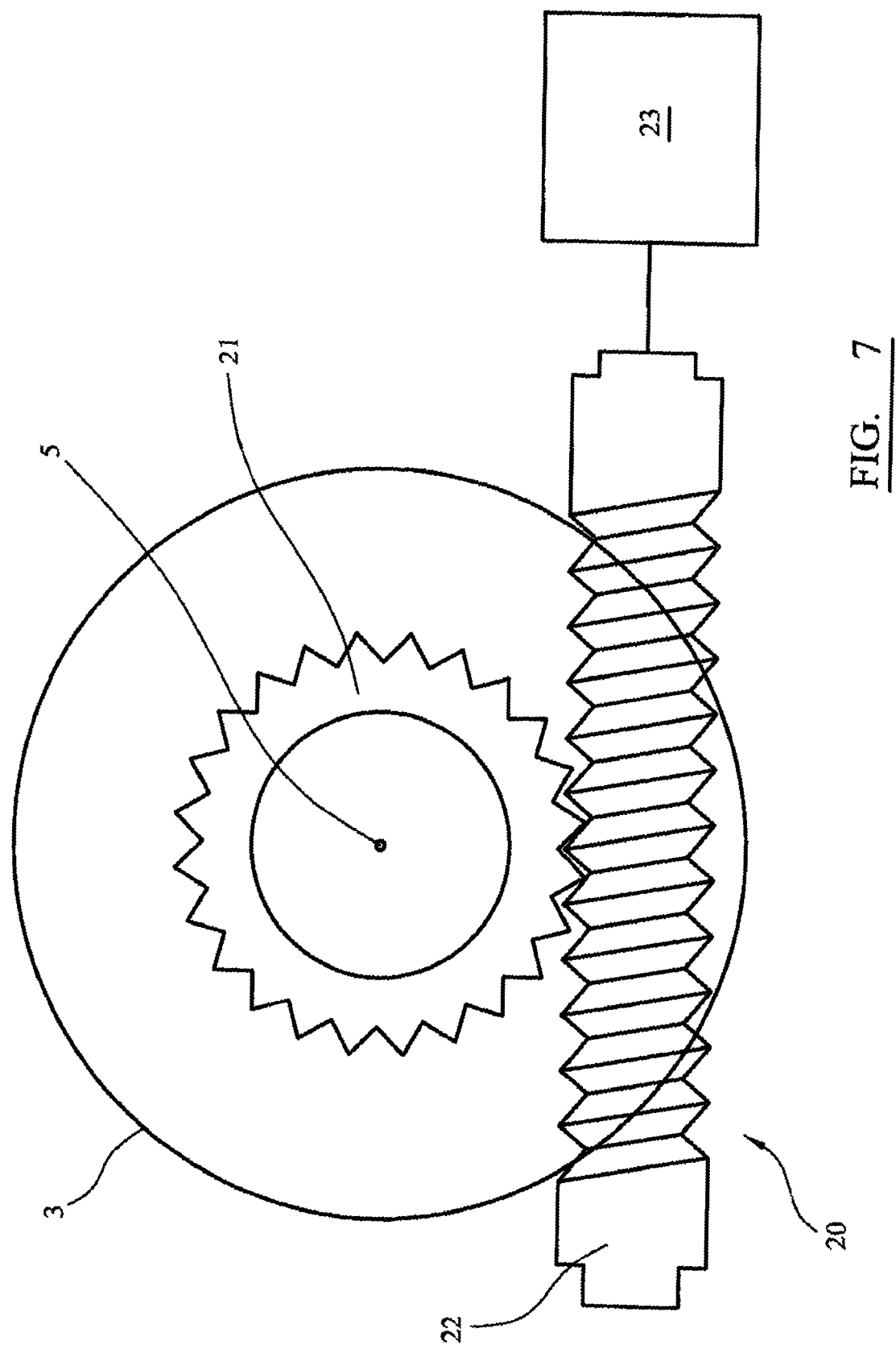
FIG. 7 shows a stub rotation mechanism of a propulsion system according to the invention.

Shown in FIG. 7 is a stub rotation mechanism 20 of an embodiment of a propulsion system 1 according to the invention. The stub rotation mechanism 20 comprises a worm gear 21. The worm gear 21 is connected to the end of the stub mast 3 and is centred on the stub mast axis 5. The stub rotation mechanism 20 further comprises a worm 22, being a rod having a helical thread on its outer surface. The thread of the worm 22 engages with the teeth of the worm gear 21 as shown. A motor 23 is connected to the worm 22. In use the motor 23 turns the worm 22. This turns the worm gear 21 so rotating the stub mast 3. Rotating the worm 22 in the opposite direction rotates the stub mast 3 in the opposite direction.

Figure 8:
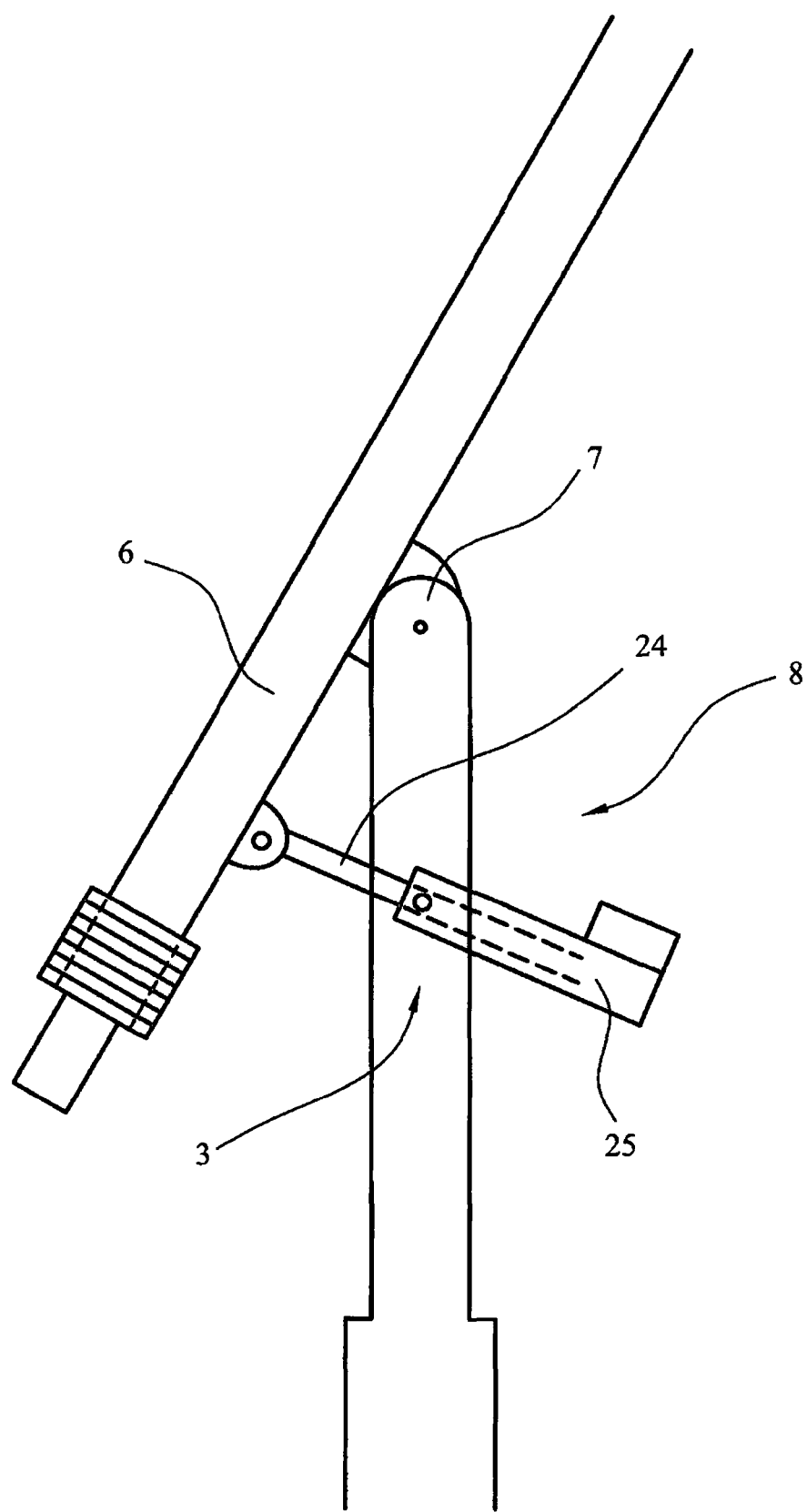
FIG. 8 shows a pivot mechanism of a propulsion system according to the invention; and, FIG. 9 shows, in schematic form, a controller of a propulsion system according to the invention.

Shown in FIG. 8 is a pivot mechanism 8 of an embodiment of a propulsion system 1 according to the invention.

The pivot mechanism 8 extends between the main mast 6 and the stub mast 3. The pivot mechanism 8 comprises an extensible ram 24. The ram 24 can be displaced between an extended position and a retracted position so varying the inclination of the main mast 6 with respect to the stub mast 3. Typically, the ram 24 is electrically driven by a ram driving mechanism 25. In alternative embodiments the ram 24 is pneumatically or hydraulically actuated.

Shown in FIG. 9 in schematic form is a controller 26 of an embodiment of a propulsion system 1 according to the invention. The controller 26 is connected to each of the displacement mechanism 13, stub rotation mechanism 20 and pivot mechanism 8. The controller 26 is also connected to sensors 27 which detect some or all of force on the aerofoils, wind speed, wind direction and solar power output.

In use a user programs the controller 26 with the course of the boat 2. In an alternative embodiment the controller 26 may determine this automatically, for example from a GPS system. On receiving the course information, the controller 26, based on the wind direction and speed, rotates the stub mast 3 to the appropriate orientation, raises the main mast 6 to the desired angle and displaces the aerofoils 9 to form a sail to propel the boat 2 in the desired direction. If the wind direction changes the controller 26 automatically rotates the stub mast 3 to, compensate. Similarly, if the wind speed changes the controller 26 displaces the aerofoils 9 to increase or decrease the effective sail area so as to optimise the forces on the boat 2. The measured force on the aerofoils 9 is typically used to perform this optimisation. The solar panels 10 on the aerofoils 9 collect sunlight so generating solar power which may be used to charge batteries on the boat 2 whilst the boat 2 is being driven by the aerofoils. The charged batteries can be used to drive electrical systems on the boat 2, for example electrical propellers to drive the boat 2 through the water or to power heating or lighting.

A further parameter that can be programmed into the controller 26 is the relative importance of wind power generation and solar power generation. If a user increases the relative importance of solar power generation the controller 26 adjusts the position of the masts 3,6, moving the aerofoils 9 away from the optimum position for collecting wind slightly and towards the sun. This decreases the amount of wind power generated but increases the amount of solar power generated. If the aerofoils 9 do not form a sail of open sail area it may be possible for the controller 26 to displace the displaceable aerofoils 9 increasing the sail area so compensating for the reduction in wind collection. Similarly, if the importance of solar power generation is reduced the controller 26 will adjust the masts 3,6 returning the aerofoils 9 back to the optimum orientation for collection of wind.

In the above described embodiment each aerofoil 9 has a solar panel 10 thereon. In an alternative embodiment only some of the aerofoils 9 have solar panels 10 thereon.

Similarly, in the above embodiment the bottom aerofoil 9 is a fixed aerofoil 9 and the remainder are displaceable aerofoils 9. In an alternative embodiment all of the aerofoils 9 are displaceable aerofoils 9. In a further alternative embodiment, a plurality of the aerofoils 9 are fixed aerofoils 9 and the remainder are displaceable aerofoils 9.

In an alternative embodiment of the invention a user programs the controller 26 with the desired positions of the main mast 6, stub mast 3 and aerofoils 9. The controller 26 then drives the displacement mechanism 13, stub rotation mechanism 20 and pivot mechanism 8 to move the masts 3,6 and aerofoils 9 to the desired positions. In a further alternative embodiment, the user does not employ a controller 26 and instead drives the displacement mechanism 13, stub rotation mechanism 20 and pivot mechanism 8 directly. In a further embodiment of the invention at least one of the stub mast 3 and main mast 6 are moved manually. In this case locking pins are typically used to lock the main mast 6 in place relative to the stub mast 3.

The invention claimed is:

1. A propulsion system for a boat comprising:
   a main mast;
   a plurality of aerofoils connected to the main mast, at least one of the aerofoils being a displaceable aerofoil, the at least one displaceable aerofoil being adapted to be displaced along the main mast between an open position and a closed position;
   wherein when the at least one displaceable aerofoil is in its open position the aerofoils together form a sail of open sail area; and
   when the at least one displaceable aerofoil is in its closed position at least some of the aerofoils overlap to form a sail of closed sail area, the closed sail area being less than the open sail area;
   a displacement mechanism adapted to displace the at least one displaceable aerofoil between its open and closed positions;
   at least one of the aerofoils having a solar panel thereon; and,
   a stub mast extending along a stub axis, the stub mast being free to rotate about the stub axis;
   the stub mast being connected to the main mast by a stub pivot;
   the propulsion system further comprising a controller connected to the displacement mechanism for controlling the arrangement of the aerofoils, the controller being configured to be programmed with a parameter which is the relative importance of wind power generation and solar power generation, the controller being adapted to detect the wind power generated and solar power generated and control the arrangement of the aerofoils in response to the parameter and the detected wind and solar power generated.

2. A propulsion system as claimed in claim 1, wherein each aerofoil has a solar panel thereon.

3. A propulsion system as claimed in claim 1, wherein the displacement mechanism comprises an endless cable extending at least part way along the main mast.

4. A propulsion system as claimed in claim 3, wherein each displaceable aerofoil is supported by an aerofoil frame, each aerofoil frame comprising a clamp for clamping the aerofoil frame to the endless cable.

5. A propulsion system as claimed in claim 1, further comprising a stub rotation mechanism for rotating the stub mast about the stub axis.

6. A propulsion system as claimed in claim 5, wherein the stub rotation mechanism comprises a mechanical gear system, preferably a worm and a worm gear.

7. A propulsion system as claimed in claim 1, further comprising a pivot mechanism for pivoting the main mast with respect to the stub mast about the pivot.

8. A propulsion system as claimed in claim 7, wherein the pivot mechanism comprises an extensible ram arranged between the main mast and stub mast.

9. A propulsion system as claimed in claim 1, wherein the controller is adapted to detect at least one of force on the aerofoils, wind speed, wind direction and solar generation output and to control the arrangement of the aerofoils in response thereto.

10. A propulsion system as claimed in claim 1, comprising a plurality of displaceable aerofoils connected to the main mast, each displaceable aerofoil being adapted to be displaced between an open position for that aerofoil to a closed position for that aerofoil, the displacement mechanism being adapted to displace each displaceable aerofoil between its open and closed positions.

11. A propulsion system as claimed in claim 10, wherein each displaceable aerofoil is adapted to be displaced to a different open position.

12. A propulsion system as claimed in claim 10, wherein all of the displaceable aerofoils are adapted to be displaced to the same closed position.

13. A boat comprising:
a propulsion system including:
a main mast;
a plurality of aerofoils connected to the main mast, at least one of the aerofoils being a displaceable aerofoil, the at least one displaceable aerofoil being adapted to be displaced along the main mast between an open position and a closed position;
wherein when the at least one displaceable aerofoil is in its open position the aerofoils together form a sail of open sail area; and
when the at least one displaceable aerofoil is in its closed position at least some of the aerofoils overlap to form a sail of closed sail area, the closed sail area being less than the open sail area;
a displacement mechanism adapted to displace the at least one displaceable aerofoil between its open and closed positions;
at least one of the aerofoils having a solar panel thereon; and,
a stub mast extending along a stub axis, the stub mast being free to rotate about the stub axis;
the stub mast being connected to the main mast by a stub pivot;
the propulsion system further comprising a controller connected to the displacement mechanism for controlling the arrangement of the aerofoils, the controller being configured to be programmed with a parameter which is the relative importance of wind power generation and solar power generation, the controller being adapted to detect the wind power generated and solar power generated and control the arrangement of the aerofoils in response to the parameter and the detected wind and solar power generated.

14. A boat as claimed in claim 13, wherein the displacement mechanism comprises an endless cable extending at least part way along the main mast.

15. A boat as claimed in claim 14, wherein each displaceable aerofoil is supported by an aerofoil frame, each aerofoil frame comprising a clamp for clamping the aerofoil frame to the endless cable.

16. A boat as claimed in claim 13, further comprising a pivot mechanism for pivoting the main mast with respect to the stub mast about the pivot.

17. A boat as claimed in claim 16, wherein the pivot mechanism comprises an extensible ram arranged between the main mast and stub mast.

18. A boat as claimed in claim 13, wherein the controller is adapted to detect at least one of force on the aerofoils, wind speed, wind direction and solar generation output and to control the arrangement of the aerofoils in response thereto.

* * * * *